United States Patent [19]

Knapp

[11] 4,343,012

[45] Aug. 3, 1982

[54] PRINTER CONTROL CIRCUIT

[75] Inventor: Robert F. Knapp, Friendsville, Pa.

[73] Assignee: International Business Machines Corporation, Armonk, N.Y.

[21] Appl. No.: 221,223

[22] Filed: Dec. 30, 1980

[51] Int. Cl.[3] .............................................. G01D 15/24

[52] U.S. Cl. ................................ 346/139 R; 400/279; 400/320; 400/323

[58] Field of Search ........... 346/139 R, 139 A, 139 B; 400/120, 124, 320, 323, 328, 279, 322, 280–282; 250/208, 209, 231 SE, 578

[56] References Cited

U.S. PATENT DOCUMENTS

| | | | |
|---|---|---|---|
| 4,037,230 | 7/1977 | Fujimoto et al. | 346/139 R X |
| 4,176,977 | 12/1979 | Shepard, Jr. | 400/320 |
| 4,195,938 | 4/1980 | Velazquez | 400/124 |
| 4,225,251 | 9/1980 | Klimek et al. | 400/124 |
| 4,285,606 | 8/1981 | Giacone | 400/322 X |

*Primary Examiner*—Joseph W. Hartary
*Assistant Examiner*—W. J. Brady
*Attorney, Agent, or Firm*—Kenneth P. Johnson

[57] ABSTRACT

Circuit for generating from a pair of pulse trains produced in phase quadrature both an indication of the direction of print head motion and the production of timing signals from the leading and trailing edges of the pulses of only one of the two pulse trains. A pair of transducers is used to sense a timing disk rotating in synchronism with the movement of a carrier for a plurality of print elements moving along a print line which transducers are generating respective output pulse trains which are in phase quadrature relation to the other. The circuit provides timing signals for controlling the energization of the print elements at print positions along the print line and retains the same polarity for printing in either direction.

6 Claims, 3 Drawing Figures

PRINTER CONTROL CIRCUIT

BACKGROUND OF THE INVENTION

This invention relates generally to serial matrix printers and more particularly to a circuit for generating timing pulses to control the firing of print elements in such printers while moving in either direction along a print line.

In serial matrix printers, characters are formed along a print line from a matrix of selectively disposed dots produced on the recording medium by selectively energized print elements. The print elements can be impact wires or electrodes which cause a change in the color of the recording surface thermally or by removal of portions of a surface layer. To achieve good printing quality, the times at which the print elements are energized is critical to align successive rows of dots. In addition, the elements are frequently operated in both the forward and reverse direction, and hence timing must be made the same in either direction of travel.

Both the indication of direction of travel of the print head and timing pulse generation for the print elements are obtained through the application of a pair of signals produced in phase quadrature to an appropriate logic circuit. Examples of generation of direction signals and timing signals are found in U.S. Pat. Nos. 4,225,251 and 4,195,938. In the first patent, the respective successions of output signals from the two transducers are logically combined to determine direction of motion of the print head, and print element control signals are generated at each edge of each pulse in each succession of pulses. In the second patent, transducers likewise are placed relative to a band of alternating transparent and opaque windows to produce successions of pulses in phase quadrature for purposes of determining direction, but the print element timing signals are generated from only leading edge of only one of the successions of pulses.

OBJECTS AND SUMMARY OF THE INVENTION

A primary object of this invention is to provide optical pulse emitter apparatus for a printer which is capable of generating print head timing signals with greater accuracy, is less expensive to construct and requires less maintenance.

Another object of this invention is to provide optical pulse emitter apparatus for a printer in which the degree of phase quadrature is not as critical as in the prior art systems.

A still further object of this invention is to provide optical pulse emitter apparatus for a printer which is adaptable to a wide range of print velocities without the requirement of dynamic adjustment circuits.

Yet another object of this invention is to provide optical pulse emitter apparatus for a printer which maintains the same output timing pulse polarity irrespective of print head direction.

The foregoing objects are attained in accordance with the present invention by providing a timing disk rotating in synchronism with print head progression along a print line in which the disk has a single band of alternating transparent and opaque areas sensed by a pair of transducers, each providing a succession of output signals which are in phase quadrature relation to one another. The respective transducer output pulses are combined in an exclusive OR circuit whose output is applied to a gate conditioned by printer motion in the first direction and whose inverted output is applied to a second gate conditioned by printer motion in the opposite direction. The gate outputs are used to control the energization of the print elements as the print head moves along the print line.

By applying the two pulse trains to an exclusive OR circuit and gating the output with a direction signal, timing pulses are produced at the leading and trailing edges of only one of the successions of pulses so that the phase quadrature relation, while important, is much less critical than in previous circuits. This advantage permits the support block holding the transducers to be molded without neccessity of independent adjustments for the transducers. The use of the exclusive OR circuit is less expensive than the flip-flop circuit generally used for this type of timing apparatus. In printing systems using a microprocessor for control, there is a significant advantage in eliminating the time to set up a detection system for the correct polarity of the timing pulses when changing direction.

The foregoing and other objects, features and advantages of the invention will be apparent from the following more particular description of a preferred embodiment of the invention, as illustrated in the accompanying drawing.

DESCRIPTION OF THE PREFERRED EMBODIMENT

Figure 1:
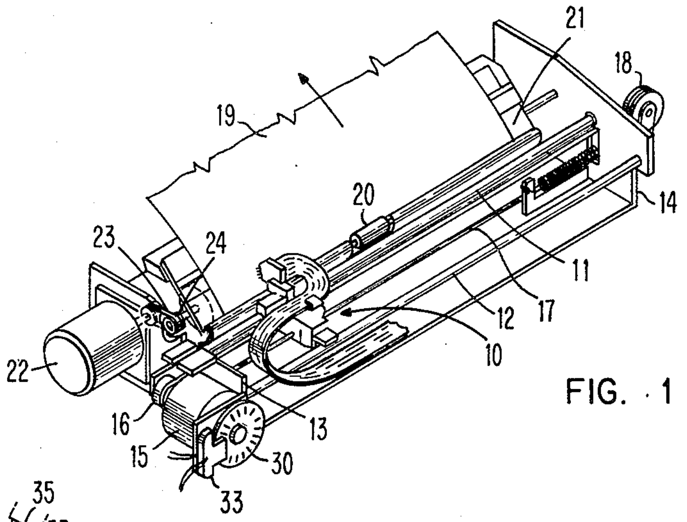
FIG. 1 is a perspective view of a serial matrix printer embodying optical emitter apparatus constructed in accordance with the principles of the invention.

Referring to FIG. 1, there is shown a serial matrix printer having a print head indicated generally as 10, movable along a print line on guide rods 11 and 12 fixed between side frames 13 and 14. The print head is translated along the print line by reversible servo motor 15 driving capstan 16 about which is wound cable 17 supported at the opposite end plate by tension pulley 18. A recording medium such as metalized paper 19 is gripped between a pressure roller 20 and a feed roll, not shown, and fed upwardly in the direction of the arrow over a platen 21. The feed roll is advanced by step motor 22, supported on side frame 13, driving belt 23 engaging the feed roll pulley 14 to advance the paper line by line.

The progression of the print head 10 along the print line and its direction of motion are detected by an emitter disk 30 having a band of alternating opaque and transparent areas 31, 32 near its periphery. The disk is supported on the shaft of motor 15 and thus moves synchronously with print head 10. A molded housing 33 supports a pair of light sources 35, 36 such as light emitting diodes on one side of disk 30 and a pair of sensors 37, 38 such as phototransistors on the opposite side of the disk. Each phototransistor has its respective light source and provides an output signal that varies with the intensity of the transmitted light that it senses through the disk grating during rotation. The two light sourcetransducer pairs are placed at the same radial distance from the disk hub but are spaced from each other along the band of opaque and transparent sectors so as to produce output signals that are in phase quadrature with each other. These signals are then processed to provide timing signals for controlling the energization of the print elements in print head 10 through a flexible cable.

When both edges of the pulses in two phase quadrature pulse trains are used for timing, the separation between transducers becomes significant to maintain uniform pulse spacing so that the output control pulses are uniformly spaced. As a result, the location and distance of one transducer with respect to the other is critical, and adjustment is tedious and may vary later with machine usage. As speeds increase, circuits may be required to made a dynamic edge tolerance adjustment which adds to the cost of the timing circuit.

In a matrix printer, the print head frequently is in the form of a single column of print elements that is normal to the direction of print head motion. The elements are selectively energizable to make a mark approximating the element dimensions adjacent the paper during the print head motion. To insure that the elements are energized at the proper times, timing pulses are generated at each columnar position reached by the print head during its travel. Since the print head 10 and timing disk 30 move in synchronism, the timing disk marks are able to indicate each column position when the transparent and opaque disk areas are the proper size.

Figure 2:
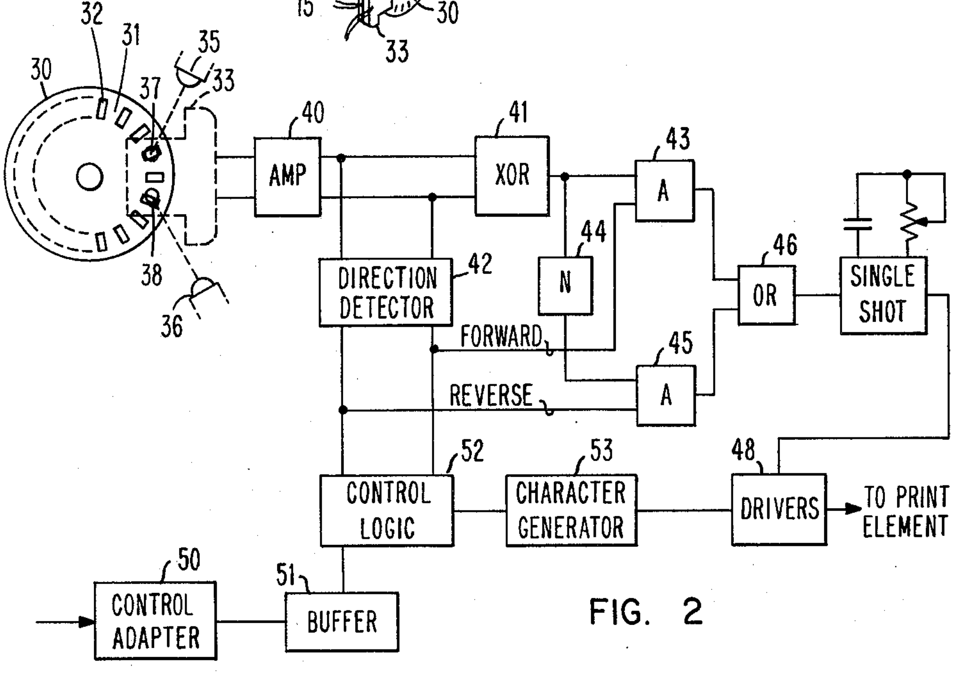
FIG. 2 is a circuit diagram showing the generation of timing pulses from a pair of transducers on the optical emitter shown in FIG. 1.
Figure 3:
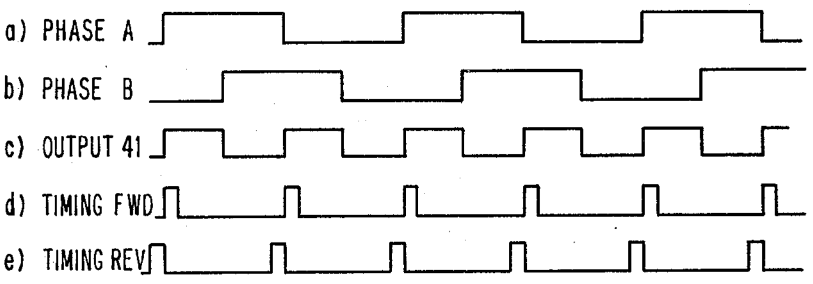
FIG. 3 is a timing diagram of waveforms for the circuit shown in FIG. 2.

A circuit for processing the output waveforms from the transducers 37 and 38 to generate the proper timing signals is shown in FIG. 2. The output signals from transducer 37 are designated phase A and those from transducer 38 are designated phase B. The output signals are transmitted to respective amplifiers 40 whose output for each phase serves as an input to exclusive OR circuit 41 and to the direction detector 42. Exclusive OR circuits are well-known in the art. The output waveforms from amplifiers 40 are shown in FIGS. 3*a* and 3*b* for the respective phases. The output signal from exclusive OR circuit 41 is applied directly to AND gate 43 and through inverter 44 to AND 45. The conditioning pulses for each of the gates 43 and 45 are the direction signals of forward or reverse from direction detector 42 so that only one of the gates will be conditioned to pass the direct or inverted pulses from exclusive OR 41. Forward and reverse signals are determined by logic that senses the succession of signal level combinations shown for the A and B phases in FIG. 3, and determining from that succession which direction the print head is moving. Such direction detection circuits are commonly used.

The output signal from exclusive OR circuit 41 is illustrated in FIG. 3*c* where it will be seen that a positive going pulse occurs with each edge of phase A transducer signal since the exclusive OR circuit provides an output only when either phase A or B signals are solely present at the input. For generating the timing signal, the active gate 43 or 45 provides an output to OR circuit 46. The output from OR 46 is applied as a trigger to adjustable monostable or single shot circuit 47 which, in turn, provides a gating pulse to the several print element driver circuits 48. The waveform in FIG. 3*d* illustrates the pulses for the driver circuit as the print head travels in a forward direction. Single shot 47 is made adjustable to control the duration of the print element energization pulse, and thereby control the intensity of printed marks on the paper.

Data to be printed are applied through an interface circuit 50 buffer storage 51. Control logic 52 gates the characters singly along with a direction signal to a character generator 53 which then provides columnar data for controlling the respective driver for each print element in the print head.

It will be seen from the foregoing description and FIG. 3 that the timing pulses for controlling drivers 48 are generated at each edge of the phase A pulses and that the precise time of occurrence of the phase B pulses is not critical since it serves only for permitting both edges of the phase A pulses to be recognized. As a result, housing 33 for the transducers need not provide a separate adjustment for the spacing of the two transducers held therein since their positions can be molded within an acceptable tolerance. Further, the resulting diming pulses are of the same polarity. They can be made either positive or negative going, but they retain the same polarity for either direction. This eliminates the requirement in many instances, for a microprocessor to be set up differently for each direction to recognize the proper signals. In the disclosed circuit, it will be noted that the transducer for phase A should be adjusted so that it operates on approximately a 50% duty cycle to uniformly space the timing signals.

While the invention has been particularly shown and described with reference to a preferred embodiment thereof, it will be understood by those skilled in the art that changes in form and details may be made therein without departing from the spirit and scope of the invention.

What is claimed is:

1. In a printer having a recording medium supported on a platen and a carrier with energizable print elements thereon movable along said platen for recording data serially on a print line, the combination comprising:

drive means for moving said carrier along said platen to advance said print elements from one print position to another;

timing means connected to said drive means movable in synchronism with said carrier comprising a disk of alternate transparent and opaque sectors in a band of constant radius about said disk;

sensing means including light source means and a pair of tansducers fixedy disposed on opposite sides of said disk with said transducers each generating as an output waveform a succession of pulses representing the quantity of light passing through said sectors as said disk moves, said transducers being spaced from each other along said band to provide their respective output pulses in phase quadrature; and circuit means for combining the two successions of said pulses to produce an output timing signal for enabling said print elements at the leading and trailing edges of each of the pulses in only one of said successions of pulses as said disk moves in one direction.

2. Apparatus as described in claim 1 wherein said drive means is a rotary drive means and said disk rotates therewith.

3. Apparatus as described in claim 1 wherein the said two pulse successions are supplied to an exclusive OR logic circuit.

4. Apparatus as described in claim 3 wherein said timing pulses are generated on only the leading edge of each output pulse from said exclusive OR circuit.

5. Apparatus as described in claim 3, further including means for detecting a predetermined direction of motion of said drive means and means for combining the output of the direction detecting means and the inverted output pulses of said exclusive OR circuit to provide output timing signals during motion of said carrier in an opposite direction.

6. Apparatus as described in claim 1 wherein said circuit means includes a single shot circuit responsive to said timing signal.

* * * * *